United States Patent [19]
van Deventer et al.

[11] Patent Number: 5,491,763
[45] Date of Patent: Feb. 13, 1996

[54] OPTICAL HYBRID WITH 3×3 COUPLING DEVICE

[75] Inventors: Mattijs O. van Deventer, Leidschendam; Johannes J. G. M. van Der Tol, Zoetermeer, both of Netherlands

[73] Assignee: Koninklijke PTT Nederland N.V., AC Groningen, Netherlands

[21] Appl. No.: 61,302

[22] Filed: May 13, 1993

Related U.S. Application Data

[63] Continuation-in-part of Ser. No. 39,766, Mar. 30, 1993, abandoned.

[30] Foreign Application Priority Data

Apr. 3, 1992 [NL] Netherlands ............... 9200634

[51] Int. Cl.$^6$ ................................................. G02B 6/26
[52] U.S. Cl. ................... 385/24; 385/17; 385/39
[58] Field of Search .................. 385/1–3, 14–17, 385/24, 30, 39, 46, 48, 50

[56] References Cited

U.S. PATENT DOCUMENTS

| | | | |
|---|---|---|---|
| 4,732,447 | 3/1988 | Wright et al. | 385/46 |
| 4,755,016 | 7/1988 | DeLoach, Jr. et al. | 385/15 X |
| 4,932,735 | 6/1990 | Koai | 385/17 |
| 5,058,101 | 10/1991 | Albanese et al. | 385/24 X |

FOREIGN PATENT DOCUMENTS

| | | |
|---|---|---|
| 0248234A1 | 12/1987 | European Pat. Off. . |
| 53-101446 | 9/1978 | Japan . |
| 63-254404 | 10/1988 | Japan . |
| 63-503013 | 11/1988 | Japan . |
| 63-267922 | 11/1988 | Japan . |
| 2-159133 | 6/1990 | Japan . |
| 2-196533 | 8/1990 | Japan . |
| 2214381A | 8/1989 | United Kingdom . |
| WO86/07513 | 12/1986 | WIPO . |
| WO87/06356 | 10/1987 | WIPO . |

OTHER PUBLICATIONS

Y. Wang et al, "A 90° optical fiber hybrid for optimal signal power utilization", Oct. 1, 1987, pp. 4181–4184, Applied Optics, vol. 26, No. 19.

L. G. Kazovsky, "Phase- and Polarization-Diversity Coherent Optical Techniques", Feb. 1989, pp. 279–292, Journal of Lightwave Technology, vol. 7, No. 2.

L. G. Kazovsky et al, "All-fiber 90° optical hybrid for coherent communications", Feb. 1, 1987, pp. 437–439, Applied Optics, vol. 26, No. 3.

*Primary Examiner*—John D. Lee
*Attorney, Agent, or Firm*—Frishauf, Holtz, Goodman, Langer & Chick

[57] ABSTRACT

In known coherent optical receivers comprising two detectors, optical 90° hybrids have a 'throughput' $\leq 25\%$. Theoretical analysis reveals that a higher 'throughput' of up to a maximum of approximately 29.3% is possible. The invention provides such a 90° hybrid (30) of the coupler type with the aid of a 2×2 port which is based on a loss-free 3×3 directional coupler having the maximum throughput ratios between two of the inputs (31/39, 32/40) and two of the outputs (39/34, 40/35) and the 90° phase difference between said two outputs, the third input and the third output not being used. An integrated version employing indium phosphide is described.

13 Claims, 2 Drawing Sheets

OPTICAL HYBRID WITH 3×3 COUPLING DEVICE

This application is a continuation-in-part of application Ser. No. 08/039,766, filed Mar. 30, 1993 now abandoned.

A. BACKGROUND OF THE INVENTION

1. Field of the Invention

The invention is in the field of coherent optical detection techniques. It relates to an optical hybrid and to a coherent optical receiver in which the optical hybrid is used.

2. Prior Art

Coherent optical detection using phase diversity makes baseband detection possible without the need to use 'phase-locked loop' (PLL), as is in fact the case for homodyne detection. Since efficient use can be made of the electrical and optical bandwidth in this way, phase diversity is consequently very suitable for multichannel coherent optical communication with high bit rates ($\geq 1$ Gbit/s). Considerations relating to the suppression of noise, such as thermal noise, also make the use of phase diversity attractive for high bit rates.

To retrieve the amplitude and the phase of a coherent optical signal, phase diversity makes use of optical hybrids. An optical hybrid is an m×n multiport having m signal inputs and n signal outputs, where m,n$\geq$2, which optical hybrid provides, at two or more of the outputs, coherent products of signals presented at two or more of the inputs and having mutually well-defined phase differences. There are two types of such optical hybrids used for phase diversity. Hybrids of the first type, referred to as the polarisation type, generally produce the desired phase differences between output signals having different polarisations, this being in contrast to those of the second type, referred to as the coupler type, in which the phase differences are produced between output signals having the same polarisation. A number of different variants of the coupler type are known. A first variant is based on the suitable mutual coupling of a number of parallel waveguides in order to produce the desired phase shift of 90°. Such an optical hybrid, in which four optical fibres are arranged in a fused coupling having a square section, is disclosed, for example, by reference [1]. A second variant, disclosed in reference [2], is a similar port comprising a planar strip-like guide having two inputs and four outputs, which is equivalent to four planarly arranged, coupled optical fibres. A third variant, disclosed in reference [3], is a 3×3 port which, although related to the first variant in terms of coupling, produced phase differences of 120°. In reference [4] a general S-matrix theory has been developed for reversible 3×3 fibre couplers, both loss-free and non-loss-free ones. The theory is applied to an opto-electrical 90° hybrid comprising a 3×3 coupler which is equivalent to the abovementioned third variant, which hybrid forms part of a homodyne receiver comprising three photodiodes and a 'Costas loop'.

The sensitivity of all these known variants of the coupler-type multiports is the same if all the signals at the output side of such a multiport are used for detection and thermal noise is suppressed as much as possible in the process. However, the use of more than two detectors in this case makes a receiver complex and, moreover, expensive. If, moreover, balanced detection is used, it results in a decreasing receiver bandwidth and an increase in thermal noise. It is therefore desirable not to have to use more than two detectors for the detection. For a two-detector receiver, however, the known optical hybrids are not ideal. In the known coupler-type m×n ports having 90° phase difference, the 'throughput' is always $\leq 25\%$, that is to say, not more than 25% of the signal power at the input is ever coupled out in each of the outputs used. Since optical hybrids which can be used for phase diversity can also be used for 'image rejection' heterodyne receivers, such as those disclosed in reference [4], the same restriction relating to 'throughput' applies to such receivers.

B. SUMMARY OF THE INVENTION

The object of the invention is to provide an optical hybrid having a higher 'throughput', which is therefore more beneficial for use in a two-detector receiver for coherent optical detection. Theoretical analysis of a passive, not necessarily loss-free 2×2 port shows that, for a phase difference of 90°, a coupling ratio R of not more than approximately 29% is nevertheless possible. The invention achieves this in an optical hybrid of the coupler type.

For this purpose, according to the invention, an optical hybrid having a first and a second input port, respectively, for launching a first and a second light signal, and having a first and a second output port, respectively, for coupling out a first and a second output signal, the output signals including, respectively, a first and a second coherent product of each of the input signals, with a mutual phase difference of approximately 90°, has the characteristic that the hybrid comprises a 3×3 coupling device of three coupling waveguides having three inputs and three outputs, two of the inputs forming the input ports and two of the outputs the output ports, the power throughput of each of the input ports to each of the output ports being greater than 25%. It is based furthermore on the insight that a loss-free 3×3 port having the correct throughput ratios and phase difference between two inputs and two outputs always corresponds to a non-loss-free 2×2 port, the throughput losses between said two outputs and two inputs being accounted for in the other throughput ratios. Preferably, the invention has, for this purpose, the characteristic that the coupling device is an essentially loss-free 3×3 coupling device in which the throughput coefficients for the power throughput from an ith input port to a jth output port of the 3×3 coupling device is essentially given by a throughput matrix:

$$(p_{ij}) = \begin{bmatrix} 0{,}293 & 0{,}414 & 0{,}293 \\ 0{,}414 & 0{,}172 & 0{,}414 \\ 0{,}293 & 0{,}414 & 0{,}293 \end{bmatrix}, \text{ where } i, j = 1, 2, 3.$$

The object of the invention is, moreover, to provide a coherent optical receiver in which the optical hybrid according to the invention is used.

C. REFERENCES

[1] A. R. L. Travis and J. E. Carroll: "Possible fused fibre in-phase/quadrature measuring multiport", Electronics Letters, 10th October 1985, Vol. 21, No. 21, pp 954, 955;

[2] Th. Niemeier and R. Ulrich: "Quadrature outputs from fiber interferometer with 4×4 coupler", Optics Letters, October 1986, Vol. 11, No. 10, pp 677–679;

[3] A. W. Davis et al.: "Coherent optical receiver for 680 Mbit/s using phase diversity", Electronics Letters, 2nd January 1986, Vol. 22, No. 1, pp 9–11;

[4] J. Pietzsch: "Scattering matrix analysis of 3×3 fiber couplers", Journ. Lightwave Technology, Vol. 7, No. 2, February 1989, pp. 303–307;

[5] C. J. Mahon: "Experimental verification of novel optical heterodyne image rejection receiver with polarization control", ECOC '90 Amsterdam, Vol. 1, pp. 389–392;
[6] S. Somekh, in: "Introduction to integrated optics", editor M. K. Barnoski, Cpt. 11, Plenum Press, 1974.

D. SHORT DESCRIPTION OF THE DRAWING

The invention will be explained below in greater detail by reference to a drawing comprising the following figures.

E. DESCRIPTION OF EXEMPLARY EMBODIMENTS

Figure 1:
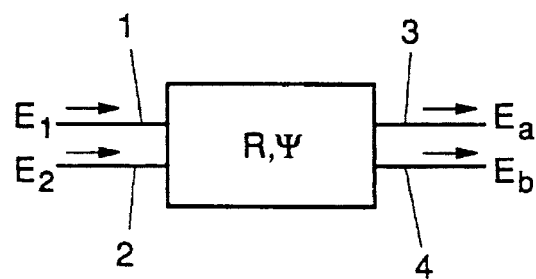
FIG. 1 shows a block diagram of a general 2×2 port which can be used as an optical hybrid.

FIG. 1 shows a block diagram of a general 2×2 port, which is known as an optical hybrid. Such a port has two inputs 1 and 2 and two outputs 3 and 4, and a throughput R and a phase angle $\Psi$. If input signals $E_1$ and $E_2$ having amplitudes $\acute{E}_1$ and $\acute{E}_2$, respectively, and having an arbitrary phase difference $\Phi$ are presented to inputs 1 and 2 of said port, respectively, viz.

$$E_1(t) = \acute{E}_1 \cos(\omega t) \quad (1a)$$

$$E_2(t) = \acute{E}_2 \cos(\omega t + \Phi) \quad (1b)$$

the signals at the outputs 3 and 4 can be written as $$E_a(t) = R^{\frac{1}{2}}\{\acute{E}_1 \cos(\omega t) + \acute{E}_2 \cos(\omega t + \Phi)\} \quad (2a)$$

$$E_b(t) = R^{\frac{1}{2}}\{\acute{E}_1 \cos(\omega t) + \acute{E}_2 \cos(\omega t + \Phi + \Psi)\} \quad (2b)$$

If such a port is passive, the total output power is always less than, or equal to, the input power for any value of the amplitudes $\acute{E}_1$, $\acute{E}_2$ and phase difference $\Phi$. If $\acute{E}_a$ and $\acute{E}_b$ are the amplitudes of the output signals $E_a(t)$ and $E_b(t)$, respectively, it is therefore true that:

$$|\acute{E}_a|^2 + |\acute{E}_b|^2 \leq |\acute{E}_1|^2 + |\acute{E}_2|^2 \quad (3)$$

By combining the expressions (2a), (2b) and (3), it can be deduced that $$R \leq \{4 \cos^2(\Psi/4)\}^{-1} \quad (4)$$

Figure 2:
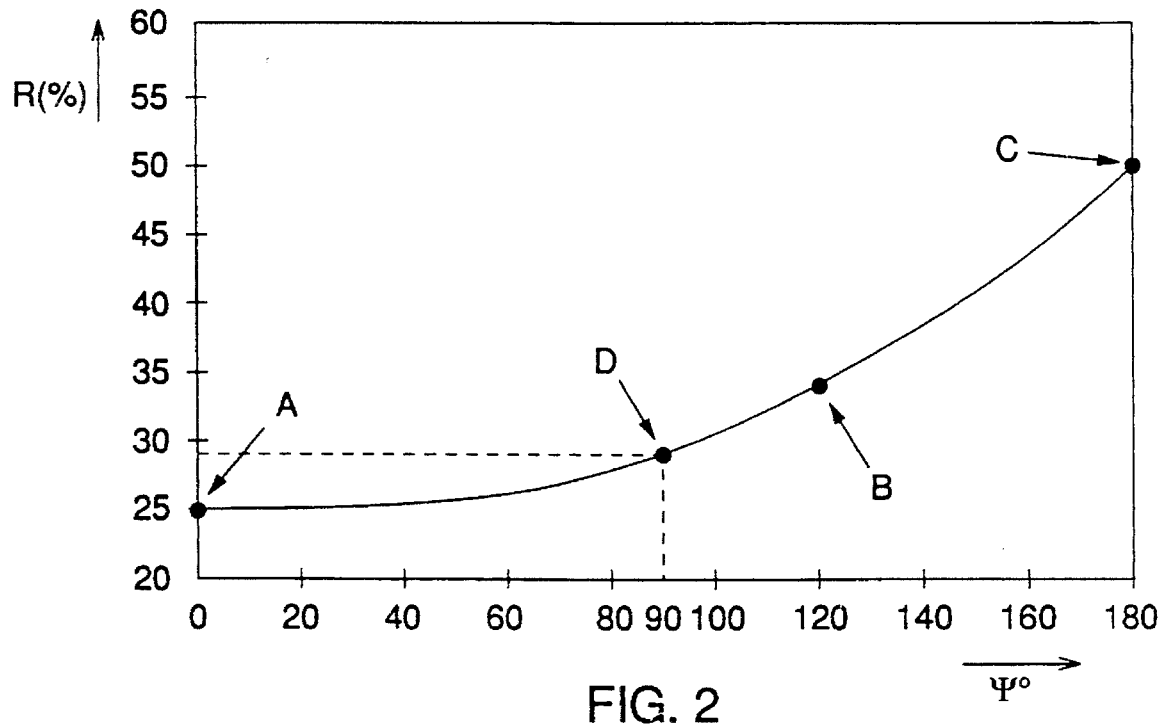
FIG. 2 shows the variation in the upper limit of the throughput R as a function of the phase angle $\Psi$ of an optical hybrid in accordance with FIG. 1.

The expression (4) defines an upper limit for the throughput R as a function of the phase angle $\Psi$ of the hybrid. The variation in this upper limit is shown in FIG. 2. In this figure:
point A ($\Psi=0°$, R=25%) corresponds to a known polarisation type of optical hybrid made up of four Y junctions;
point B ($\Psi=120°$, R=33.3%) corresponds to a known symmetrical 3×3 coupler;
point C ($\Psi=180°$, R=50%) corresponds to a known symmetrical 2×2 coupler.
Point D ($\Psi=90°$, R=29.3%) corresponds, at least theoretically, to an optical hybrid having a phase shift of 90°, hereinafter referred to as 90° hybrid, and a throughput of more than 25%.

An optical hybrid having a throughput of 29.3% can be regarded as a loss-free, partially symmetrical 3×3 coupler whose input port and output port, which are centrally situated in terms of symmetry, are not used. The throughput coefficients for the power throughput between each of the three input ports and each of the three output ports of such a loss-free 3×3 coupler is given by a throughput matrix:

$$(p_{ij}) = \begin{bmatrix} 0{,}293 & 0{,}414 & 0{,}293 \\ 0{,}414 & 0{,}172 & 0{,}414 \\ 0{,}293 & 0{,}414 & 0{,}293 \end{bmatrix}, \text{ where } i, j = 1, 2, 3.$$

As characteristics of this throughput matrix, mention may be made of the fact that it is symmetrical about each of the diagonals and that the sum of the throughput coefficients in each row and in each column is equal to one. If only the inputs i=1 and 3 and the outputs j=1 and 3 of a 3×3 coupler having a throughput matrix are used, according to the S-matrix theory as developed in reference [4] and more particularly equation (9) therein, it is precisely the desired phase angle $\Psi=90°$ which is found to occur.

Hereinafter an embodiment of a coupler-type optical 90° hybrid based on said throughput matrix such as can be used in a coherent detection system comprising two photodetectors will be described. The starting point is a symmetrical 3×3 directional coupler comprising three waveguides which run in parallel over a certain coupling length x in a coupling region between optional inlet and outlet sections. Symmetrical is understood as meaning that, in the coupling region, one of the guides is situated more centrally with respect to the two other, essentially identical waveguides. The identical waveguides have a propagation constant $\beta$ and the central waveguide has a propagation constant $\beta+\delta$ differing therefrom, it being possible for $\delta$ to be either positive or negative. It is furthermore assumed that direct coupling between the identical waveguides is negligible in the coupling region compared with the coupling between the identical waveguides and the central waveguide. On the basis of the so-called "Weak Coupled Mode Theory" (WCMT), as disclosed, for example, in reference [6], the behaviour of the guided modes of the lightwaves in the waveguides of such a directional coupler can be described by a system of coupled differential equations:

$$d_{/dx}(\chi_1) = -i\beta\chi_1 - ik\chi_2$$

$$d_{/dx}(\chi_2) = -ik\chi_1 - i(\beta+\delta)\chi_2 - ik\chi_3$$

$$d_{/dx}(\chi_3) = -ik\chi_2 - i\beta\chi_3 \quad (5)$$

In this system, $\chi_j$ is the amplitude of the guided mode in the waveguide j (j= 1, 2, 3). The system is set up in such a way that j=1, 3 correspond to the identical waveguides and j=2 corresponds to the centrally situated waveguide. k is the coupling constant, which indicates the degree of coupling between signals in each of the two identical waveguides and in the central waveguide. The system can be solved analytically with the values of each amplitude $\chi_j$ at the input of the directional coupler as boundary values. The elements of a throughput matrix $(q_{ij})$ are obtained by multiplying the solutions to this system for different boundary values at the input by their complex conjugate. The throughput matrices $(p_{ij})$ and $(q_{ij})$ are, within a certain accuracy, identical, if:

$$x \cdot k = 1.20565 \text{ and } \delta/k = 1.043 \quad (6)$$

This result is independent of propagation constant $\beta$. A 3×3 directional coupler in which the coupling length x, the difference in propagational constant $\delta$ and the coupling constant k fulfils the relationships (6) will have the required throughput matrix, the throughput coefficients having an accuracy which is better than $5 \cdot 10^{-4}$.

Although embodiments are in principle possible either on the basis of fibre couplers or in integrated form, the exemplary embodiment will be restricted to an integrated version which can be produced using known integration procedures and employs waveguide materials and structures which are standard in such cases. The exemplary embodiment will at the same time be further restricted to an integrated version employing InP and having waveguides of the ridge type.

Figure 3:
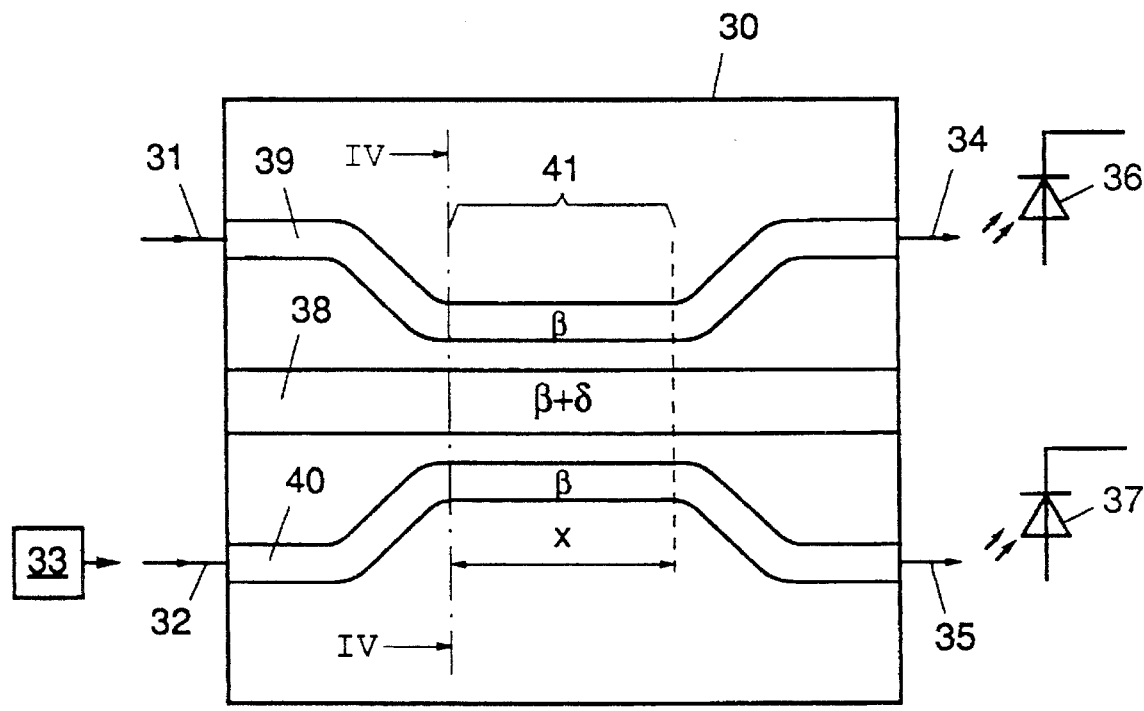
FIG. 3 shows a diagram of a coherent optical receiver comprising a coupler-type hybrid according to the invention.
Figure 4:
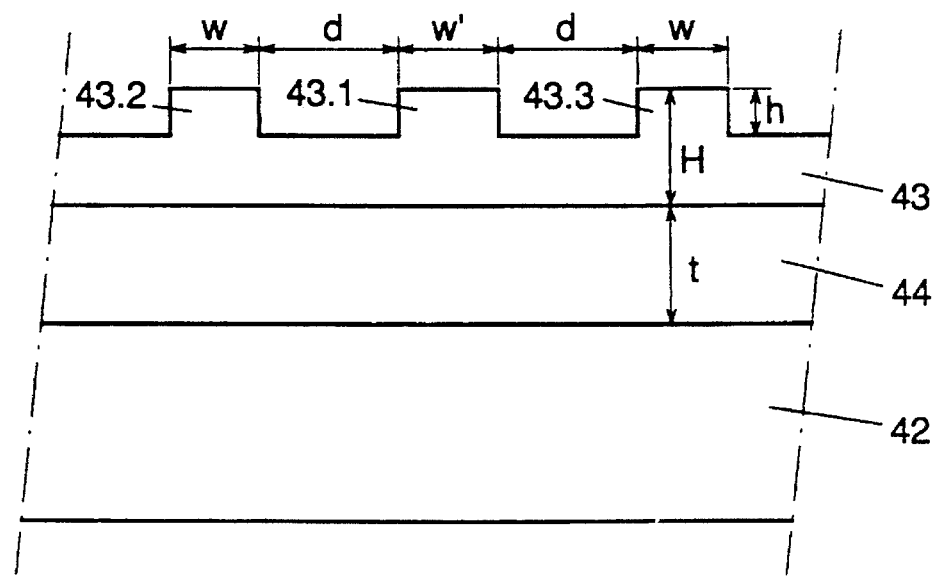
FIG. 4 shows a cross section of a waveguide structure of an integrated version of the hybrid shown in FIG. 3.

FIG. 3 shows a diagram of a coherent optical receiver for phase diversity comprising a coupler-type 90° hybrid 30 in which the waveguide structure of the hybrid is shown in plan view. Said hybrid 30 has a first signal input 31 for a received signal and a second signal input 32 for an oscillator signal originating from a local oscillator 33. The hybrid furthermore has a first signal output 34 and a second signal output 35, respectively, which are optically coupled to a first photodetector 36 and a second photodetector 37. The hybrid 30 has a central waveguide 38 and two essentially identical waveguides 39 and 40 which are the mirror image of one another with respect to the central waveguide. The central waveguide 38 has a propagation constant $(\beta+\delta)$ which differs from the propagation constant $(\beta)$ of the waveguides 39 and 40, which is expressed in the figure by a difference in width. In a coupling zone 41, the waveguides 38, 39 and 40 run parallel over a certain length x. FIG. 4 shows a cross section level with the coupling zone 41 of an integrated version employing InP of the hybrid 30. The waveguides are of the ridge type. Situated between a substrate 42 and a top layer 43, both composed of InP, is a light-guiding layer 44 composed of InGaAsP and having thickness t. The top layer 43 has ridge-type platforms 43.1, 43.2 and 43.3 having a fixed height h and a total height H locally over the entire length of the waveguides 38, 39 and 40. The ridge-type platforms 43.2 and 43.3 corresponding to the waveguides 39 and 40 have a width w and that corresponding to the waveguide 38 has a width w'. In the coupling zone 41, the ridge-type platforms have a mutual spacing d. The following values are typical of such an integrated version of a hybrid having a throughput matrix which is a good approximation to the throughput matrix ($p_{ij}$) for the wavelength of 1.5 μm used for the light signals:

refractive index of InP, $n_1=3.1754$, refractive index of InGaAsP, $n_2=3.4116$, x=4.8 mm, t=0.473 μm, H=0.390 μm, h=0.200 μm, d=5.00 μm, w=3.00 μm and w'=3.069 μm.

Simulation of the signal propagation of a TE-polarised signal launched via the waveguide 39 at one side of the coupling zone 41 of a 3×3 directional coupler defined by the values given demonstrated that approximately 28.4% of the launched signal power emerged via the waveguide 39 and approximately 29.2% via the waveguide 40 at the other side of the coupling zone 41, with a phase difference between the two emerging signals of approximately 45°. Launching of the same signal into the waveguide 40 yielded the 'mirror-image' result, that is to say with a phase difference of approximately −45°. With further optimisation of the waveguide structures, it is expected that it will be possible for the upper limit derived above for the throughput to be approached still more closely. In this connection, the effect of the inlet and outlet sections of the waveguides 38, 39 and 40 outside the coupling zone 41 should be included in the design since some coupling also takes place therein. This can be done by solving the differential equations using varying values for the coupling constant k. However, this will yield only slight changes in the relationships (6) for x and δ since the value of k decreases exponentially as the space inbetween the waveguides increases outside the coupling zone 41.

We claim:

1. Optical hybrid having a first and a second input port, respectively, for launching a first and a second light signal, and having a first and a second output port, respectively, for coupling out a first and a second output signal, the output signals including, respectively, a first and a second coherent product of each of the input signals, with a mutual phase difference of approximately 90°, characterized in that the hybrid comprises a 3×3 coupling device of three coupling waveguides having three inputs and three outputs, two of the inputs forming the input ports, and two of the outputs forming the output ports, the power throughput of each of the input ports to each of the output ports being greater than 25%.

2. Optical hybrid according to claim 1, characterized in that the coupling device is an essentially loss-free 3×3 coupling device in which the throughput coefficients for the power throughput of an ith input port to a jth output port of the 3×3 coupling device is essentially given by a throughput matrix:

$$(p_{ij}) = \begin{bmatrix} 0.293 & 0.414 & 0.293 \\ 0.414 & 0.172 & 0.414 \\ 0.293 & 0.414 & 0.293 \end{bmatrix}, \text{ where } i, j = 1, 2, 3.$$

3. Optical hybrid according to claim 2, characterized in that the coupling device comprises a coupling zone in which the three waveguides run essentially parallel over a length x, two of the waveguides being essentially identical and having a plane of symmetry through the third waveguide, in that, at least in the coupling zone, the third waveguide exhibits a difference δ in propagation constant from the propagation constants of the two essentially identical waveguides, and in that the two identical waveguides have essentially equal couplings, with coupling constant k, to the third waveguide in the coupling zone.

4. Optical hybrid according to claim 3, characterized in that the coupling length x, the difference in propagation constant δ and the coupling constant k fulfill, at least approximately, the relationships x·k=1.20565 and δ/k=1.043.

5. Optical hybrid according to claim 4, characterized in that the coupling device is a fibre coupler.

6. Optical hybrid according to claim 4, characterized in that the coupling device is an integrated optical coupler.

7. Coherent optical receiver comprising an optical local oscillator, an optical hybrid having two input ports for launching matched signals and a number $n \geq 2$ of output ports for coupling out coherent products, differing in phase, of the two launched signals, and detection means for detecting the coherent products and delivering two output signals differing mutually in phase by 90°, characterized in that the detection means comprise only two photodetectors, each coupled to one of the output ports of the optical hybrid, and in that the power throughput of each of the input ports of the optical hybrid to each of the output ports coupled to the photodetectors is greater than 25%.

8. Coherent optical receiver comprising an optical local oscillator, an optical hybrid having two input ports for launching matched signals and a number $n \geq 2$ of output ports for coupling out coherent products, differing in phase, of the two launched signals, and detection means for detecting the coherent products and delivering two output signals differing mutually in phase by 90°, characterized in that said optical hybrid comprises a 3×3 coupling device of three coupling waveguides having three inputs and three outputs, two of the inputs forming the input ports, and two of the outputs forming two of the output ports, the power throughput of each of the input ports to each of the output ports being greater than 25%, and in that the detection means comprise only two photodetectors, each coupled to one of the output ports of the optical hybrid.

9. Coherent optical receiver according to claim 8, characterized in that the coupling device is an essentially loss-free 3×3 coupling device in which the throughput coefficients for the power throughput of an ith input port to a jth output port of the 3×3 coupling device is essentially given by a throughput matrix:

$$(p_{ij}) = \begin{bmatrix} 0{,}293 & 0{,}414 & 0{,}293 \\ 0{,}414 & 0{,}172 & 0{,}414 \\ 0{,}293 & 0{,}414 & 0{,}293 \end{bmatrix}, \text{ where } i, j = 1, 2, 3.$$

10. Coherent optical receiver according to claim 9, characterized in that the coupling device comprises a coupling zone in which the three waveguides run essentially parallel over a length x, two of the waveguides being essentially identical and having a plane of symmetry through the third waveguide, in that, at least in the coupling zone, the third waveguide exhibits a difference $\delta$ in propagation constant from the propagation constants of the two essentially identical waveguides, and in that the two identical waveguides have essentially equal couplings, with coupling constant k, to the third waveguide in the coupling zone.

11. Coherent optical receiver according to claim 10, characterized in that the coupling length x, the difference in propagation constant $\delta$ and the coupling constant k fulfill, at least approximately, the relationships $x \cdot k = 1.20565$ and $\delta/k = 1.043$.

12. Coherent optical receiver according to claim 11, characterized in that the coupling device is a fiber coupler.

13. Coherent optical receiver according to claim 11, characterized in that the coupling device is an integrated optical coupler.

* * * * *